United States Patent
Muldoon

(10) Patent No.: US 10,309,306 B2
(45) Date of Patent: *Jun. 4, 2019

(54) TORQUE CONNECTOR LUBRICATION SCUPPERS

(71) Applicant: United Technologies Corporation, Hartford, CT (US)

(72) Inventor: Marc J. Muldoon, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 204 days.

This patent is subject to a terminal disclaimer.

(21) Appl. No.: 14/510,644

(22) Filed: Oct. 9, 2014

(65) Prior Publication Data

US 2015/0052873 A1 Feb. 26, 2015

Related U.S. Application Data

(63) Continuation of application No. 14/277,472, filed on May 14, 2014, now Pat. No. 8,857,149.

(60) Provisional application No. 61/869,883, filed on Aug. 26, 2013.

(51) Int. Cl.
*F02C 7/36* (2006.01)
*F02C 7/06* (2006.01)
*F02C 3/04* (2006.01)
*F16H 57/04* (2010.01)

(52) U.S. Cl.
CPC .................. *F02C 7/06* (2013.01); *F02C 3/04* (2013.01); *F02C 7/36* (2013.01); *F16H 57/0431* (2013.01); *F16H 57/0482* (2013.01); *F05D 2260/40311* (2013.01); *F05D 2260/609* (2013.01); *F05D 2260/98* (2013.01)

(58) Field of Classification Search
CPC ...... F02C 7/06; F02C 7/36; F02C 3/04; F16H 57/0431; F16H 57/0432; F16H 57/0482
See application file for complete search history.

(56) References Cited

U.S. PATENT DOCUMENTS 2,862,356 A 12/1958 Kent et al.
5,391,125 A * 2/1995 Turra .................... F16H 1/2836
475/331
5,466,198 A * 11/1995 McKibbin ............... F02C 6/206
475/346

(Continued)

FOREIGN PATENT DOCUMENTS

WO 2014/028089 A2 2/2014

OTHER PUBLICATIONS

Jane's Aero-Engines, Apr. 1997, Issue Seven, pp. 510-512.*

(Continued)

*Primary Examiner* — Steven M Sutherland
(74) *Attorney, Agent, or Firm* — Carlson, Gaskey & Olds, P.C.

(57) ABSTRACT

A turbofan engine includes a fan rotatable about an axis, a compressor section, a combustor in fluid communication with the compressor section, a turbine section in fluid communication with the combustor, a fan drive gear system including a carrier for supporting a plurality of gears, and a scupper capturing lubricant during gear operation and directing lubricant into the carrier. A fan drive gear system is also disclosed.

10 Claims, 6 Drawing Sheets

(56) References Cited

U.S. PATENT DOCUMENTS

| | | | |
|---|---|---|---|
| 5,472,383 A * | 12/1995 | McKibbin | F16H 57/0482 |
| | | | 184/6.12 |
| 5,910,063 A * | 6/1999 | Kato | F16H 57/0427 |
| | | | 475/159 |
| 6,223,616 B1 | 5/2001 | Sheridan | |
| 6,602,158 B2 | 8/2003 | Wildeshaus | |
| 6,616,562 B2 | 9/2003 | Ohmi et al. | |
| 7,011,599 B2 | 3/2006 | Becquerelle et al. | |
| 7,270,620 B2 | 9/2007 | Tiesler et al. | |
| 7,883,439 B2 | 2/2011 | Sheridan et al. | |
| 7,967,713 B2 * | 6/2011 | Haupt | F16H 57/0427 |
| | | | 475/160 |
| 8,230,974 B2 | 7/2012 | Parnin | |
| 8,267,826 B2 | 9/2012 | Duong et al. | |
| 8,307,626 B2 | 11/2012 | Sheridan | |
| 8,343,002 B1 | 1/2013 | Lewis et al. | |
| 8,484,942 B1 | 7/2013 | McCune et al. | |
| 2006/0223664 A1 | 10/2006 | Duong et al. | |
| 2011/0172048 A1 | 7/2011 | Nishida et al. | |

OTHER PUBLICATIONS

International Search Report and Written Opinion for International Application No. PCT/US14/52230 dated Sep. 9, 2014.
International Preliminary Report on Patentability for International Application No. PCT/US14/52230 dated Mar. 10, 2016.
European Search Report for EP Application 14839500.7 dated Aug. 12, 2016.

* cited by examiner

TORQUE CONNECTOR LUBRICATION SCUPPERS

CROSS REFERENCE TO RELATED APPLICATION

This application is a continuation of U.S. application Ser. No. 14/277,472 filed May 14, 2014, which claims priority to U.S. Provisional Application No. 61/869,883 filed on Aug. 26, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

A carrier is provided to support rotation of the gears within the gear assembly. The carrier is attached to a torque frame to accommodate torque loads on the gear assembly. A series of pins extending through both the torque frame and carrier provides the connection between the torque frame and carrier. The pins are the only sliding interface, other than the gears, within the gear assembly and can be a source of wear if not sufficiently lubricated. Pressurized lubricant is communicated through passages within the pins to provide lubricant to the contact interface. Providing passages to and through each of the pins complicates assembly and increases costs. Accordingly, it is desirable to design and develop alternate lubricant arrangements to reduce cost and maintain lubricant efficiencies.

SUMMARY

A turbofan engine according to an exemplary embodiment of this disclosure, among other possible things includes a fan rotatable about an axis, a compressor section, a combustor in fluid communication with the compressor section, a turbine section in fluid communication with the combustor, a fan drive gear system including a carrier for supporting a plurality of gears, and a scupper capturing lubricant during gear operation and directing lubricant into the carrier.

In a further embodiment of the foregoing turbofan engine, a torque frame is attached to the carrier by a plurality of connectors extending between the carrier and torque frame for securing the torque frame to the carrier and lubricant captured by the scupper is directed to at least one of the plurality of connectors.

In a further embodiment of any of the foregoing turbofan engines, the fan drive gear system includes a sun gear driving a plurality of intermediate gears supported by the carrier and a ring gear circumscribing the plurality intermediate gears. The ring gear is fixed relative to rotation of the carrier about an axis of rotation.

In a further embodiment of any of the foregoing turbofan engines, the carrier is configured to rotate about an axis of rotation and generate centrifugal forces for driving exhaust lubricant through the space between each of the plurality of connectors and one of the carrier and torque frame.

In a further embodiment of any of the foregoing turbofan engines, the scupper is a portion of the torque frame.

In a further embodiment of any of the foregoing turbofan engines, the scupper is a portion of the carrier.

In a further embodiment of any of the foregoing turbofan engines, the scupper includes a scoop that directs lubricant into the carrier.

In a further embodiment of any of the foregoing turbofan engines, the fan drive gear system provides a speed reduction between the turbine section and the fan section of greater than about 2.3.

In a further embodiment of any of the foregoing turbofan engines, the turbofan engine is a high bypass geared aircraft engine having a bypass ratio of greater than about ten (10).

In a further embodiment of any of the foregoing turbofan engines, the turbofan engine includes a Fan Pressure Ratio of less than about 1.45.

In a further embodiment of any of the foregoing turbofan engines, the turbine section includes a fan drive turbine coupled to drive the fan through the fan drive gear system and a second turbine forward of the fan drive turbine and a ratio of a number of fan blades in the fan and a number of rotors in the fan drive turbine is between about 3.3 and about 8.6.

A fan drive gear system according to an exemplary embodiment of this disclosure, among other possible things includes a carrier configured to support a plurality of gears. A scupper captures lubricant during gear operation and directs lubricant into a space defined within the carrier.

In a further embodiment of the foregoing fan drive gear system, a torque frame is attached to the carrier by a plurality of connectors extending between the carrier and torque frame for securing the torque frame to the carrier and lubricant captured by the scupper is directed to at least one of the plurality of connectors.

In a further embodiment of any of the foregoing fan drive gear systems, the scupper is a portion of the torque frame.

In a further embodiment of any of the foregoing fan drive gear systems, the plurality of connectors are each press fit at each distal end into the carrier and the space is defined between each connector and the torque frame.

In a further embodiment of any of the foregoing fan drive gear systems, the scupper is a portion of the carrier.

In a further embodiment of any of the foregoing fan drive gear systems, the plurality of connectors are press fit at each distal end into the torque frame and the space is defined between each connector and the carrier.

In a further embodiment of any of the foregoing fan drive gear systems, includes a sun gear driving a plurality of intermediate gears supported by the carrier and a ring gear circumscribing the plurality intermediate gears. The ring gear is fixed relative to rotation of the carrier about an axis of rotation.

In a further embodiment of any of the foregoing fan drive gear systems, the carrier is configured to rotate about an axis of rotation and generate centrifugal forces for driving exhaust lubricant through the scupper.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
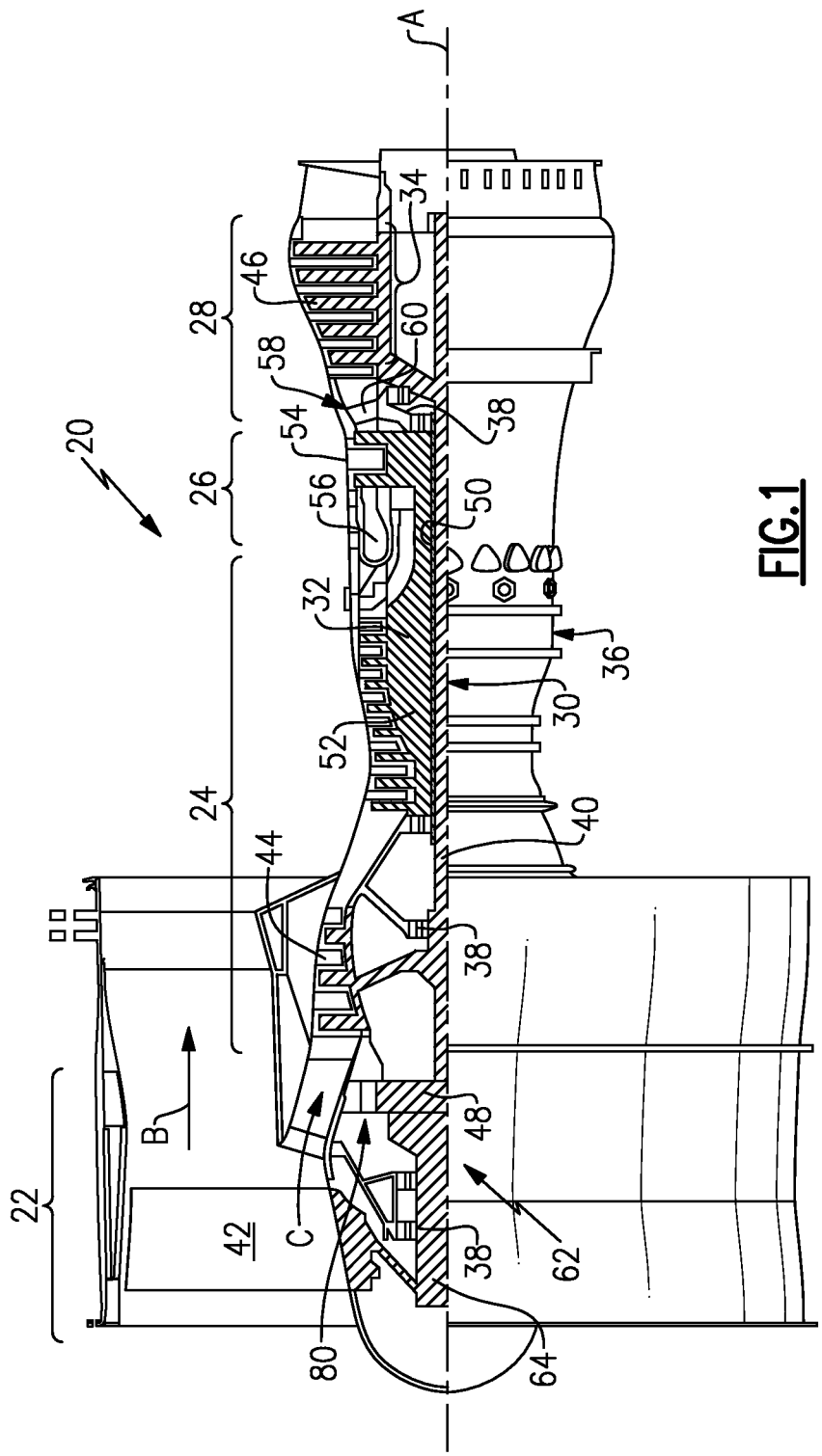
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV")

system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram \, °R)/(518.7° \, R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 discloses an example gas turbine engine 20 with increased power transfer efficiency.

Figure 2:
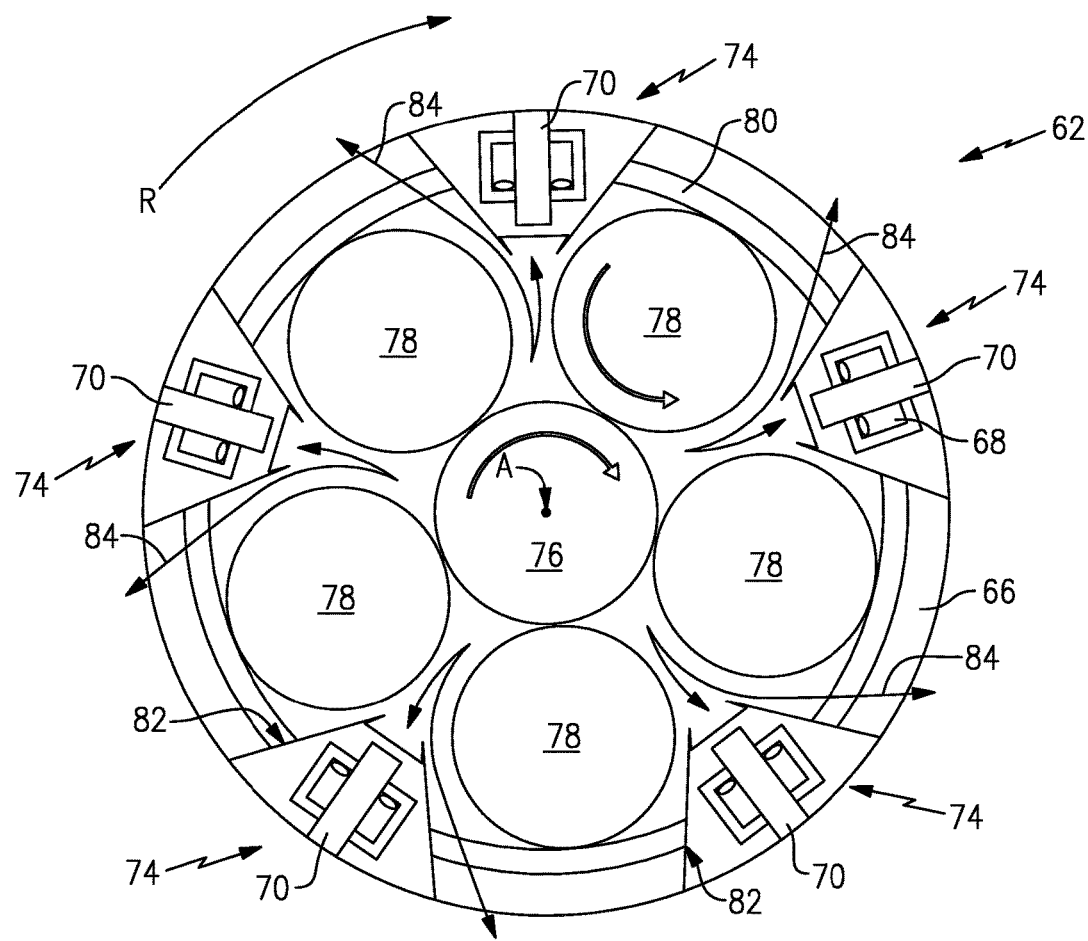
FIG. 2 is a schematic representation of an example fan drive gear system.

Referring to FIG. 2, with continued reference to FIG. 1, the example gas turbine engine 20 includes a fan drive gear system 62 that includes the geared architecture 48. The fan drive gear system 62 drives a fan shaft 64 that, in turn, drives the fan blades 42 about the axis A.

The example geared architecture 48 gear arrangement is referred to as a planetary system and includes intermediate or planet gears 78 supported by a carrier 66. The carrier 66 rotates to drive the fan shaft 64.

Figure 3:
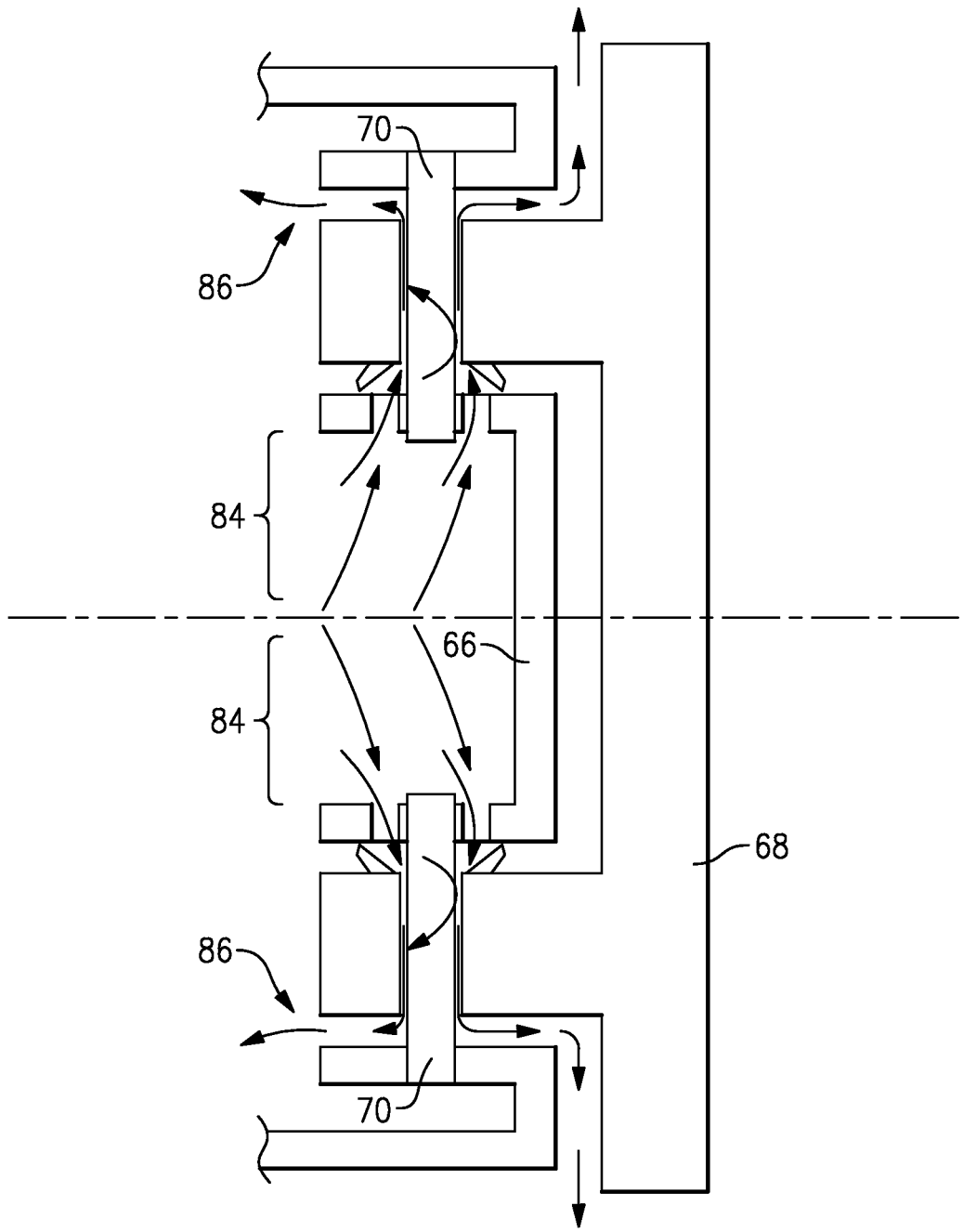
FIG. 3 is a schematic cross-sectional view of the example fan drive gear system.
Figure 4:
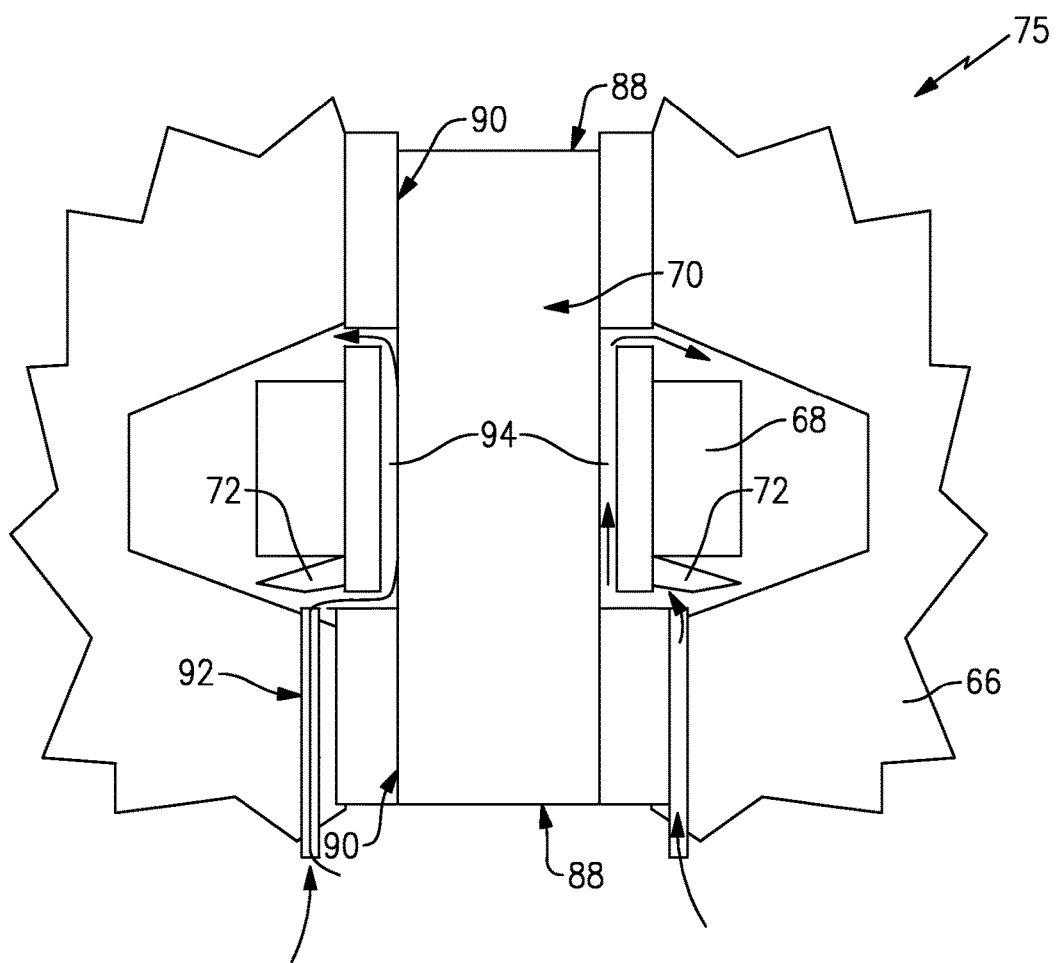
FIG. 4 is an enlarged schematic view of an interface between example torque frame and carrier.

Referring to FIGS. 2, 3 and 4 with continued reference to FIG. 1, the example fan drive gear system 62 includes a carrier 66 that is secured to a torque frame 68 at a plurality of connection interfaces 74 spaced apart circumferentially. Each of the connection interfaces includes a connector 70, which may, as shown, be in the form of a pin.

The carrier 66 supports rotation of the plurality of intermediate gears 78 that are arranged about a sun gear 76. The sun gear 76 drives the intermediate or planet gears 78 that are supported within the carrier 66. The intermediate gears 78, in turn, are circumscribed by a ring gear 80 (schematically shown in FIGS. 1 and 2). In this example of a fan drive gear system 62, the ring gear 80 is fixed to a static structure 36 of the gas turbine engine 20 (FIG. 1). The carrier 66 and torque frame 68 rotate about the axis A in response to rotation of the sun gear 76. In this example, the carrier 66 and torque frame 68 rotate in the direction indicated by the arrow R about the engine axis A in a direction common with rotation of the sun gear 76.

The gears 78 are driven by the sun gear 76 and are fed with a lubricant flow that is communicated to the interface between the sun gear 76 and the intermediate gears 78. Lubricant that has been flowed through the interface between meshed gears is exhausted outwardly and is typically received within a gutter or other lubricant capture arrangement. In this example, a portion of that exhausted lubricant indicated by arrows 84 is captured within an accumulator 82 defined within the carrier 66. The accumulator 82 captures some of the exhausted lubricant 84 and communicates that lubricant to the interface 74.

The interface 74 between the torque frame 68 and the carrier 66 is provided through the pin 70. Ends 88 of the pin 70 are attached to the carrier by corresponding press fits 90. The press fit 90 of the pin 70 secures the torque frame 68 to the carrier 66. The example press fit 90 is an interference fit that provides a desired fit to maintain the ends 88 of the pin 70 within the carrier 66.

The fit between the torque frame 68 and the pin 70 is a running or clearance fit and includes a space 94. Lubricant is directed through the space 94 to reduce wear and flush out debris.

Rotation of the fan drive gear system 62 generates a centrifugal force that drives the lubricant 84 radially outward once exhausted from the meshing interface between the sun gear 76 and each of the plurality of the intermediate gears 78. The lubricant 84 is captured and channeled towards the interfaces 74 defined between the torque frame 68 and the carrier 66.

The interfaces 74 between the torque frame 68 and the carrier 66 are the only relative moving elements, other than the gear interface, within the fan drive gear system 62 and therefore may wear undesirably if not properly lubricated.

The example fan drive gear system 62 channels the exhausted lubricant 84 into the space 94 defined between each of the pins 70 and the torque frame 68.

The exhausted lubricant 84 is channeled first through the accumulator 82 defined in the carrier 66 towards the interfaces 74 by the centrifugal forces generated by rotation of the carrier 66. The lubricant 84 is further directed by scuppers 72 defined on the torque frame 68. The scuppers 72 take the lubricant 84 and direct it into the space 94 between the pin 70 and the torque frame 68.

In this example, the scuppers 72 are funnel or scoop shaped features that are formed directly into the torque frame 68 and direct the radially discharged exhaust lubricant 84 towards into the space 94. The space 94 is open at each end such that lubricant 84 flow enters and is exhausted from the space 94 to provide a continued replenishment of lubricant between the pin 70 and the torque frame 68.

Figure 6:
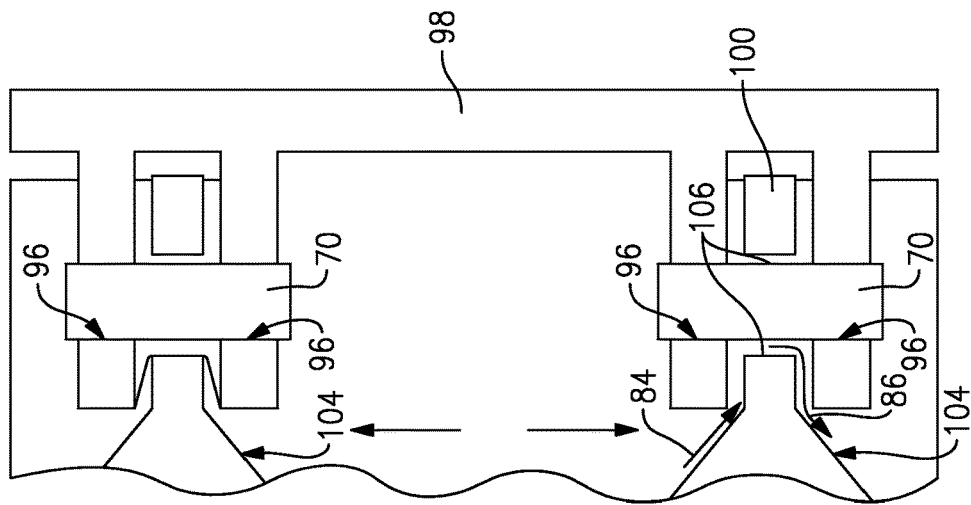
FIG. 6 is a cross-sectional view of the example fan drive gear system shown in FIG. 5.
Figure 5:
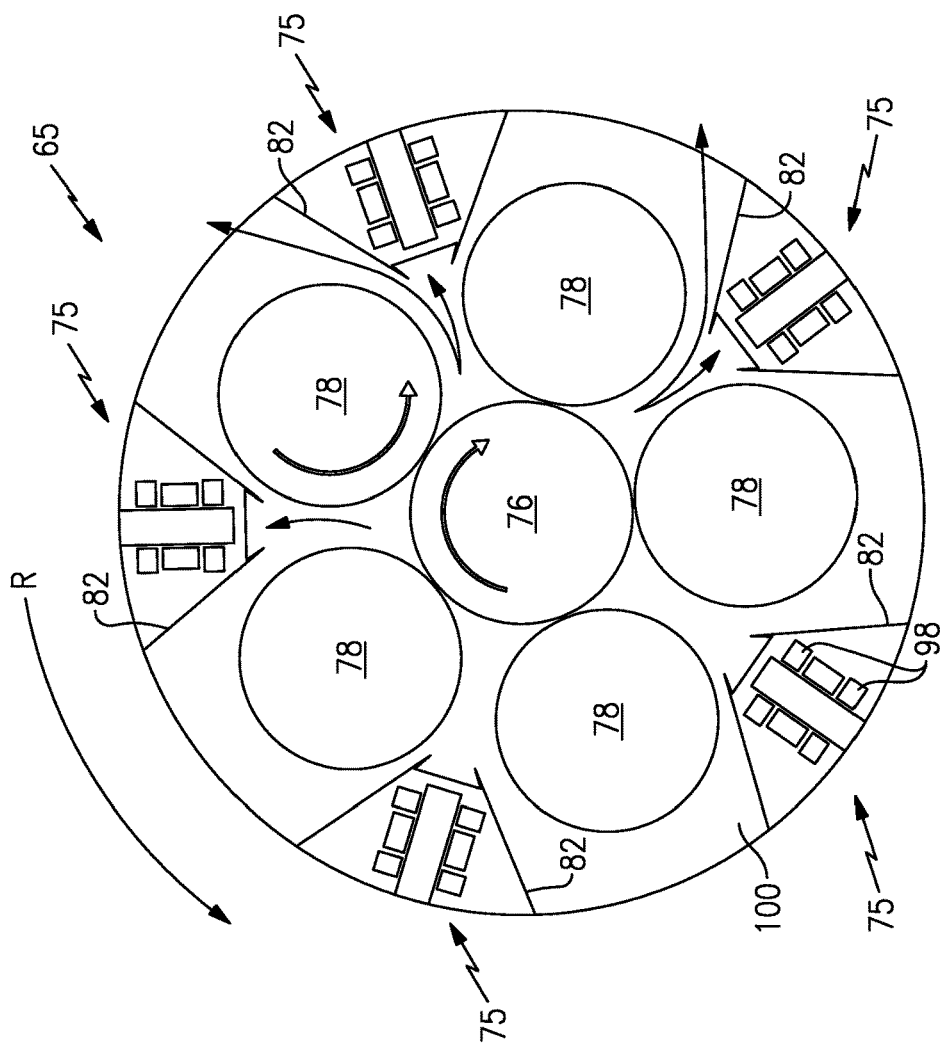
FIG. 5 is another schematic representation of another fan drive gear system.
Figure 7:
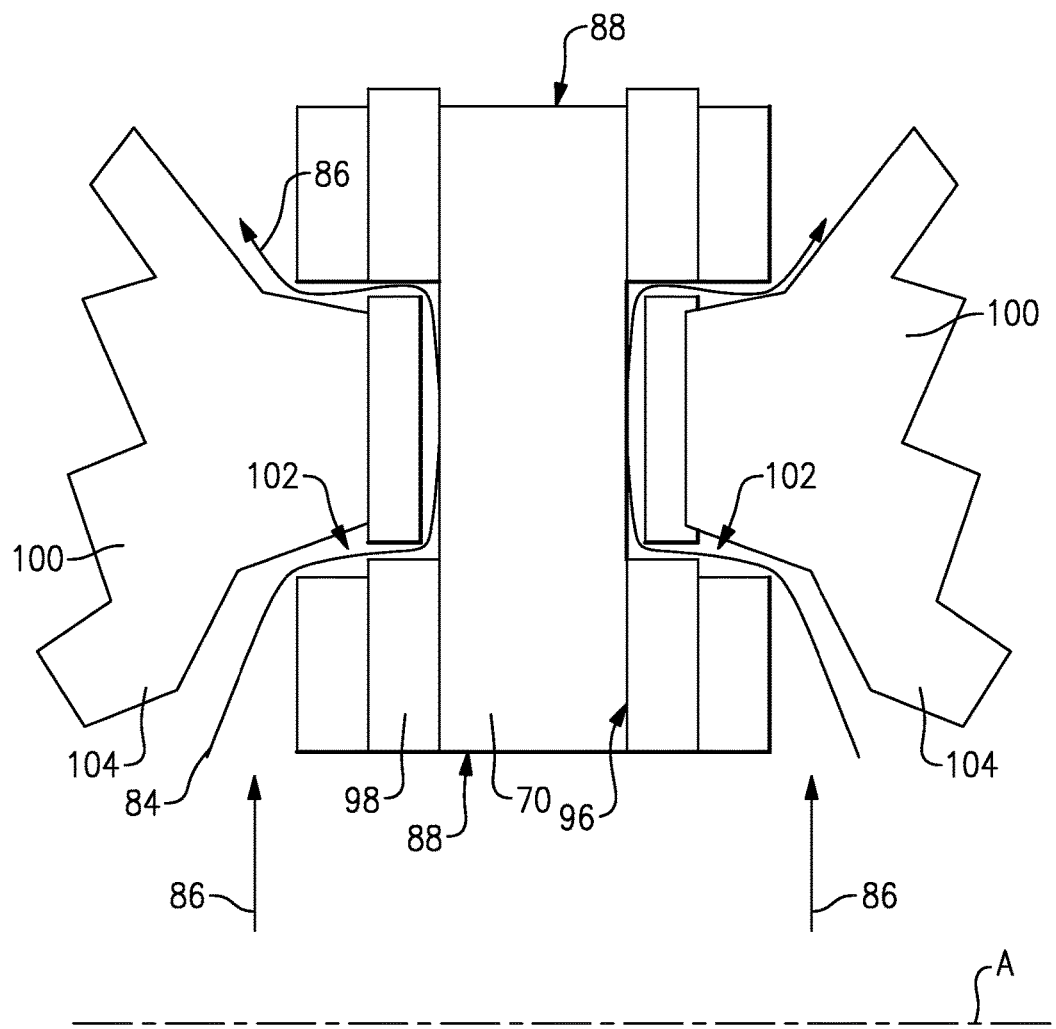
FIG. 7 is an enlarged cross-section of another interface between a carrier and torque frame.

Referring to FIGS. 5, 6 and 7 with continued reference to FIG. 1, another fan drive gear system 65 includes a carrier 100 that is attached to a torque frame 98 through interfaces 75. The interfaces 75 include a connector 70 (which may, as shown, be in the form of a pin) secured with a press fit to the torque frame 98 and a running fit with the carrier 100. The carrier 100 includes a lubricant scupper 104 that channels exhausted lubricant 84 into a space 106 defined between the pin 70 and the carrier 100. In this instance, the scupper 104 comprises a passage 102 that directs lubricant 84 into the space 106 between the pin 70 and the carrier 100.

In operation, lubricant exhausted from the interface between the sun gear 76 and the intermediate gears 78 is flung radially outward towards the interfaces 75 between the carrier 100 and the torque frame 98. Some of the exhausted lubricant 84 is simply flung radially outward into gutter and other structures (not shown) that are provided to accumulate the exhausted lubricant 84.

A portion of lubricant 84 is captured by the accumulators 82 defined within the carrier 100 and channeled toward each of the interfaces 75. In this example, there are five interfaces 75 circumferentially spaced evenly about the periphery of the carrier 100 and the torque frame 98. In this example, the scupper 104 defines the passage 102 that captures the radially outward flung lubricant 84 and directs that lubricant into the space 106 between the pin 70 and the carrier 100.

As appreciated in this example, a running fit is provided between the carrier 100 and the pin 70. A press fit 96 is provided between the torque frame 98 and the pin 70. Lubricant flows through the space 106 and is exhausted as is indicated by arrows 86 to ensure a continued replenishment of lubricant. The force and pressures required to drive lubricant into the space 106 and 94 is provided by the centrifugal forces generated by rotation of the carrier 100 and torque frame 98.

Accordingly, the example interface configuration provides for the continued lubrication of the interface between the torque frame 98 and the carrier 100 without the use of pressurized lubricant flow provided by a pump. Moreover, because lubricant is communicated through scuppers and other oil scavenging configurations arranged on either the torque frame 98 or the carrier 100, complex and difficult to manufacture passages through the pins 70 are not required. Accordingly, the example configuration provides for the lubrication of the interfaces without complex machining by utilizing the centrifugal forces generated during operation.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbofan engine comprising:
   a fan rotatable about an axis;
   a compressor section;
   a combustor in fluid communication with the compressor section;
   a turbine section in fluid communication with the combustor;
   a fan drive gear system including a carrier for supporting a plurality of gears;
   a plurality of connectors securing the carrier to another structure; and
   a scupper capturing lubricant during gear operation and directing lubricant into a space between the carrier and at least one of the plurality of connectors.

2. The turbofan engine as recited in claim 1, wherein the fan drive gear system includes a sun gear driving a plurality of intermediate gears supported by the carrier and a ring gear circumscribing the plurality of intermediate gears, wherein the ring gear is fixed relative to rotation of the carrier about an axis of rotation.

3. The turbofan engine as recited in claim 1, wherein the scupper is a portion of the carrier.

4. The turbofan engine as recited in claim 1, wherein the scupper comprises a scoop that directs the lubricant into the carrier.

5. The turbofan engine as recited in claim 1, wherein the plurality of connectors comprise a plurality of pins.

6. A fan drive gear system comprising:
   a carrier configured to support a plurality of gears;
   a plurality of connectors securing the carrier to another structure; and
   a scupper for capturing lubricant during gear operation and directing the lubricant into a space defined between the carrier and at least one of the plurality of connectors.

7. The fan drive gear system as recited in claim 6, wherein the scupper is a portion of the carrier.

8. The fan drive gear system as recited in claim 6, including a sun gear driving a plurality of intermediate gears supported by the carrier and a ring gear circumscribing the plurality of intermediate gears, wherein the ring gear is fixed relative to rotation of the carrier about an axis of rotation.

9. The fan drive gear system as recited in claim 6, wherein the carrier is configured to rotate about an axis of rotation and generate centrifugal forces for driving exhaust lubricant through the scupper.

10. The fan drive gear system as recited in claim 6, wherein the plurality of connectors comprises a plurality of pins.

* * * * *